H. F. SHEPHARD.
TRUCK WINDLASS.
APPLICATION FILED JUNE 12, 1918.

1,276,584.

Patented Aug. 20, 1918.

WITNESSES

INVENTOR
Henry F. Shephard
BY
ATTORNEYS

UNITED STATES PATENT OFFICE.

HENRY F. SHEPHARD, OF NEW YORK, N. Y.

TRUCK-WINDLASS.

1,276,584.

Specification of Letters Patent.   Patented Aug. 20, 1918.

Application filed June 12, 1918. Serial No. 239,608.

*To all whom it may concern:*

Be it known that I, HENRY F. SHEPHARD, a citizen of the United States, and a resident of the city of New York, Richmond Hill, borough of Queens, in the county of Queens and State of New York, have invented a new and Improved Truck-Windlass, of which the following is a full, clear, and exact description.

Among the principal objects which the present invention has in view are: to provide a windlass mechanism removably mounted on a truck body; to provide means for transporting said mechanism; and to save the space required for a mechanism of the character mentioned in a truck body.

Drawings.

Figure 1:
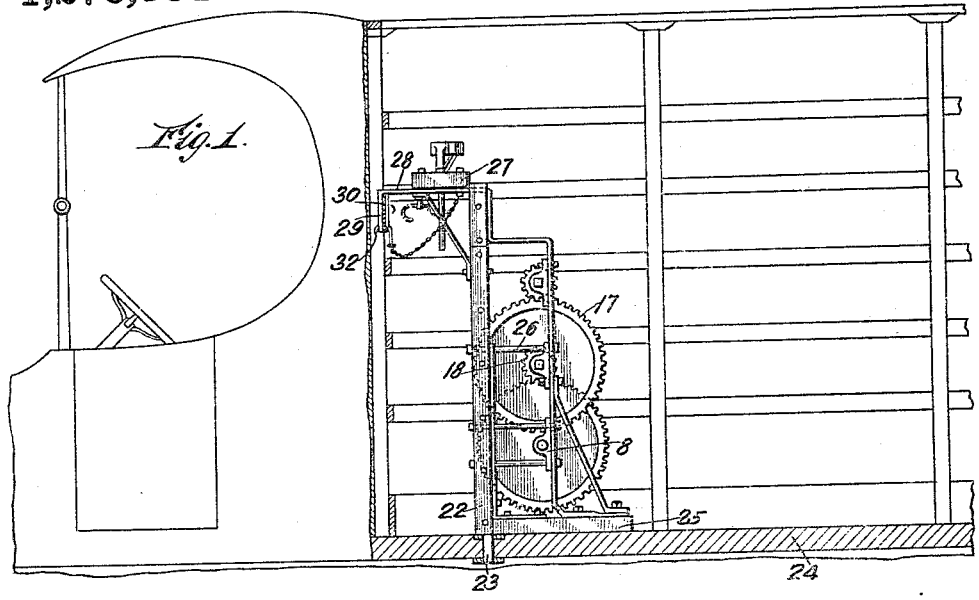
Figure 1 is a side view of a windlass constructed and arranged in accordance with the present invention, the same being shown in conjunction with a fragment of the truck body, a portion of the truck body being shown as in section in said figure.
Figure 2:
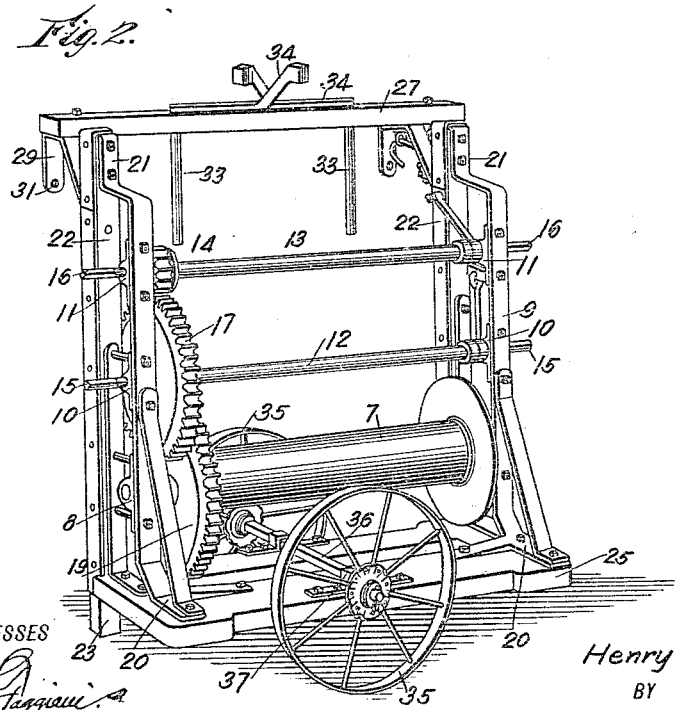
Fig. 2 is a perspective view of a windlass mechanism constructed and arranged in accordance with the present invention detached from the truck body and in position to be transported.

Description.

As seen in the drawings, a windlass drum 7 is mounted in bearing blocks 8 bolted to the upright framing bars 9. Each framing bar 9 is provided to carry the bearing blocks 8, 10 and 11. The bearing blocks 10 support the shaft 12, while the blocks 11 support the shaft 13. The last-mentioned shaft is what may be termed the power shaft upon which the pinion 14 is mounted. Both shafts 12 and 13 have square wrench ends 15 and 16, respectively. The teeth of the pinion 14 are meshed with the teeth of the large transmission gear wheel 17, while a pinion 18 on the shaft 12 is meshed with the teeth of the large gear wheel 19.

The speed reduction of the gear train comprising the pinions 14 and wheel 17, and pinion 18 and wheel 19, corresponds with the power increment transmitted from the shaft 13 to the drum 7.

The bars 9 are bent to provide feet 20 and 21. The feet 21 are bolted or otherwise rigidly secured to standards 22. The standards 22 have reduced extensions or tenons 23, adapted to fit in sockets in the floor 24 of a truck vehicle. The standards 22 form with the bars 9, side frames erected on a base or platform 25. The frames are reinforced by tie bolts 26, which extend between the bars 9 and the standards 22. The standards 22 are restrained from spreading at the top by a beam 27. The beam 27 is supported by brackets 28, the ends 29 whereof are adapted to rest behind a retaining bar 30, which is incorporated in the structure of the truck. The bar 30 is provided with perforations which aline with the perforations 31 at the extremes of the ends 29. The perforations 31 thus provided in the bar 30 are intended to hold in service the hooks 32. When the hooks 32 are disposed in the perforations in the bar 30 and in the ends 29, the windlass frame is prevented from lifting so as to disengage the tenon 23, which would permit the windlass and frame to shift in the car structure.

The beam 27 is provided with sockets to receive the handle ends 33 of the cranks 34. When the windlass is lifted, so that the tenons 23 are removed from the sockets provided therefor, the carrying wheels 35 are attached to said windlass frame. The wheels 35 are rotatively mounted on an axle 36, which is squared in cross section to fit the squared loops 37, which may be temporarily bolted or otherwise secured to the members of the platform 25. The wheels 35 are sufficiently large to lift the tenons 23 clear of the floor 24 of the truck and of the ground after the windlass has been removed from the truck. By means of these wheels, the windlass may be rolled to any suitable position for storage.

Claims.

1. An apparatus as characterized comprising a winding drum; a crank shaft; a gear train operatively connecting said crank shaft and winding drum, said train being arranged for multiplication of power applied to said drum; a frame for supporting said drum, shaft and train, said frame being adapted for temporary installation on a truck body; means for holding said frame in operative relation to said body, said means embodying upright framing standards, the lower extremities whereof are adapted for fitting sockets in said body; and means for attaching said standards at the upper end thereof to the permanent structure of said body.

2. An apparatus as characterized comprising a winding drum; a crank shaft; a gear train operatively connecting said crank shaft and winding drum, said train being arranged for multiplication of power applied to said drum; a frame for supporting said drum, shaft and train, said frame being adapted for temporary installation on a truck body; means for holding said frame in operative relation to said body, said means embodying upright framing standards, the lower extremities whereof are adapted for fitting sockets in said body; and means for attaching said standards at the upper end thereof to the permanent structure of said body, said means embodying brackets horizontally extended adjacent the upper end thereof for engaging the structure of said body.

HENRY F. SHEPHARD.